United States Patent [19]
Gardner

[11] Patent Number: 5,583,481
[45] Date of Patent: Dec. 10, 1996

[54] LOW TIRE WARNING SYSTEM

[76] Inventor: Marvin E. Gardner, P.O. Box 104, Heber City, Utah 84032

[21] Appl. No.: 239,587

[22] Filed: May 9, 1994

[51] Int. Cl.$^6$ ................................................ B60C 23/00
[52] U.S. Cl. ...................... 340/442; 340/443; 200/61.24
[58] Field of Search .................................. 340/442, 443, 340/436, 437; 200/61.23, 61.24, 61.41, 61.42, 61.44; 116/34 R; 73/146.5, 146.4, 146.2

[56] References Cited

U.S. PATENT DOCUMENTS

| 1,638,983 | 8/1927 | Crone | 340/443 |
|---|---|---|---|
| 1,646,164 | 10/1927 | Moscate | 340/443 |
| 2,258,334 | 10/1941 | Miller | 340/443 |
| 2,469,931 | 5/1949 | Pratt | 340/443 |
| 2,640,119 | 8/1950 | Bradford | 340/443 |
| 2,740,007 | 3/1956 | Amelang | 340/443 |
| 2,741,673 | 4/1956 | Metcalf | 340/443 |
| 2,917,020 | 12/1959 | Rivers | 340/443 |
| 3,055,998 | 9/1962 | Collins | 340/443 |
| 3,413,598 | 11/1968 | Uphoff | 340/443 |
| 3,602,885 | 8/1971 | Grajeda | 340/443 |
| 3,610,851 | 10/1971 | Krupski | 340/443 |
| 3,984,808 | 10/1976 | Laz et al. | 340/443 |
| 4,075,602 | 2/1978 | Clothier | 340/443 |
| 4,187,495 | 2/1980 | Mitchell | 340/443 |
| 4,943,798 | 7/1990 | Wayne | 340/443 |
| 5,327,116 | 7/1994 | Davidson | 340/443 |

*Primary Examiner*—John K. Peng
*Assistant Examiner*—Nina Tong

[57] ABSTRACT

A low tire warning system comprising a warning box (11) to attach to or set on the dashboard (12) of any operator controlled vehicle. The warning box (11) has within, a lighted on/off switch (13), a red warning light (14), and buzzer (15) to warn said operator of a low or flat tire on that vehicle or any vehicle/s in tow. The system is powered by plugging it into the cigarette lighter socket (16) found on the dashboard (12) of most vehicles or it may be hard-wired to a power source and grounded. The warning box (11) is connected to sensor switches (25) mounted perpendicular to the roadway (28) on the axle (23) or axles of said vehicles close to the pneumatic tires (24). The sensor switch (25) is comprised of an electrical spring actuator rod (27) running through a rubber insulator (26) inside a metallic cylinder (32). This electrical spring actuator rod (27) hangs freely in the bottom portion of the metallic cylinder (32) and extends beyond the bottom end thereof to just above the roadway (28). The conductor wire (21) from the warning box (11) is attached to the top of the electrical spring actuator rod (27). Upon the event of a low tire, the electrical spring actuator rod (27) touches the roadway (28) bending it over to make contact with the bottom of the metallic cylinder (32) wall thereby completing the electrical circuit that sets off the warning light (14) and buzzer (15).

4 Claims, 3 Drawing Sheets

LOW TIRE WARNING SYSTEM

BACKGROUND

1. Field of Invention

My invention is a device for warning motorists that the air pressure in one or more of the tires on their motor vehicle and/or any vehicle being towed is low.

2. Prior Art

The safe operation of any vehicle having pneumatic tires is dependent on the maintenance of proper air pressure in the tires. Loss of pressure, for any reason, can cause the tire to prematurely wear. It can also create heat by excessive flexing that will soon damage the tire irreparably. If such a low tire condition is not detected quickly enough, the performance of the towing vehicle or the vehicle being towed can be affected so adversely as to cause the vehicle operator to lose control. This can result in an accident causing property damage as well as bodily injury. Further, it has been known that low tires on vehicles being towed have gone on undetected for long enough periods of time that the tire has completely disintegrated, leaving the rim to rub the roadway causing sparks to inflame the grasses and forest on the side of the road.

The need for a low tire warning system has heretofore prompted the creation of various devices calculated to detect low pressure in pneumatic tires and then alert the motorist. However, these mechanisms have proved too complex to be commercially viable. Further, such systems have been laden with many drawbacks such as unreliability, expense, not being versatile enough to fit most vehicles, lack of sensitivity, inability to capture the vehicle operator's attention, and appliance longevity. In the event of a low or flat tire, some of these devices are likely to be damaged, rendering them useless for future low tire events. Some examples of such devices are: U.S. Pats. Nos. 3,602,885; 3,610,851; 4,075,602; 4,187,495; 4,814,744; and 5,032,822.

OBJECTS AND ADVANTAGES

Accordingly, the several objects and advantages of my low tire warning system are to provide a low tire warning system including a visual as well as an audible signal warning to the vehicle operator in response to the sensing of a low or flat tire on the motor vehicle or vehicle being towed.

Another object of my low tire warning system is to provide a box containing an on/off switch, red warning light, and warning buzzer that is small enough to easily attach to or to set on the dashboard or place in any other convenient location in the cab of any motor vehicle thus making it more portable than any prior art.

A further object is to provide an on/off switch that is lighted enabling the operator to know when the device is on and operable.

A further object is to provide not only a red warning light for visual, but a warning buzzer (audible signal generator) for audio, that will enhance the potential to capture the operator's attention more readily than just one or the other.

A still further object is to provide a device that is powered by plugging it into the cigarette lighter socket, found on virtually all motor vehicles, thus making the device more portable than other such devices.

Another object is to provide a system with plurality of extension wires and connectors on a single conductor wire running from the box to a sensor switch(s) enabling this device to be easily installed on virtually any vehicle or set of vehicles.

A further object is to provide a sensor switch that is easily clamped to any shape, size or type of axle or axle housing, or other suitable part of a vehicle, with a holder clamp that allows the sensor switch to be readily adjusted to any vehicle with any size tire.

A still further object is to provide a sensor switch that is so simple that it has few components and only one moving part.

The overall object of my low tire warning system is to make an effective and economical low tire warning system that can be easily installed on virtually any vehicle after their manufacture. The simplicity, ease of installation, lack of moving parts, few components, and versatility of mounting, makes this device far more commercially acceptable, long lasting, and inexpensive, as well as extremely reliable.

These, as well as other objectives and advantages, will become even more apparent in the following Detailed Description Of The Invention with references by numerals to the accompanying drawings.

LIST OF REFERENCE NUMERALS

11—warning box
12—dashboard
13—lighted on/off switch
14—red warning light
15—warning buzzer (audible signal generator)
16—cigarette lighter socket
17—cigarette lighter plug
18—positive power line
19—ground line
20—in-line fuse
21—conductor wire 22—single wire connectors
23—axle
24—tire
25—sensor switch
26—rubber insulator
27—electrical spring actuator rod
28—roadway
29—hose type clamp
30—rivet
31—cylinder holder clamp
32—metallic cylinder
33—adjustment bolt & nut
34—two wire connector
35—chassis ground wire
36—motor vehicle
37—trailer

DETAILED DESCRIPTION OF THE INVENTION

Figure 1:
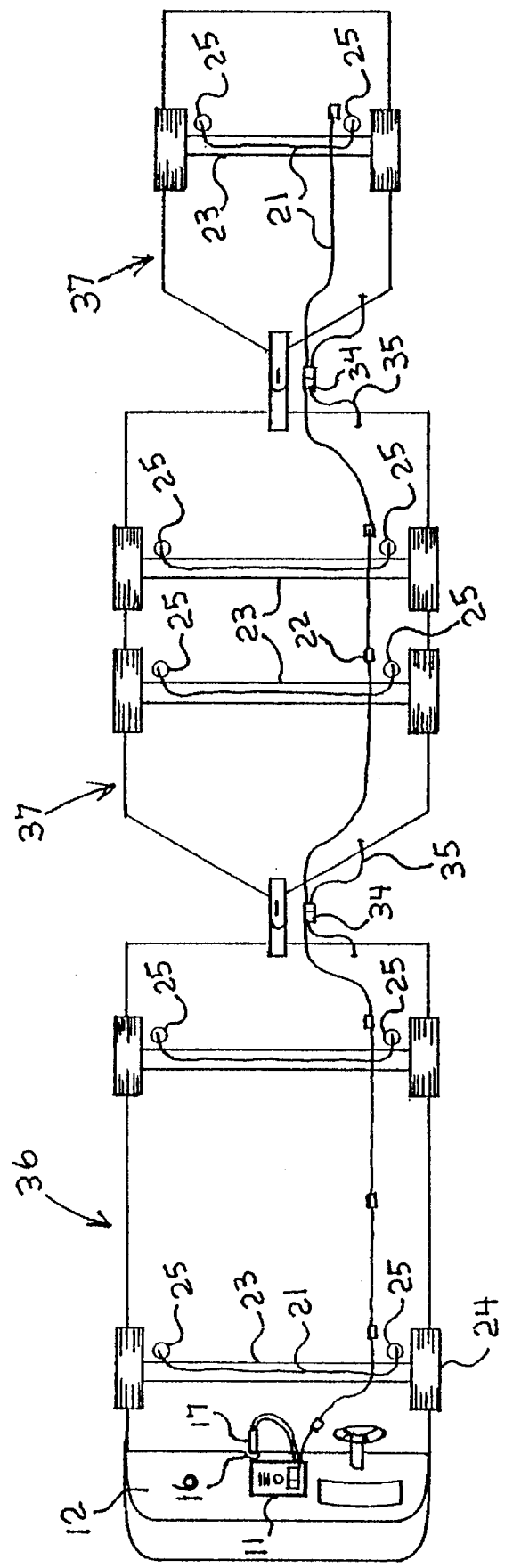
FIG. 1 is an overhead, fragmentary, overall view showing a set-up of my low tire warning system on a motor vehicle towing a trailer that is towing another trailer.
Figure 2:
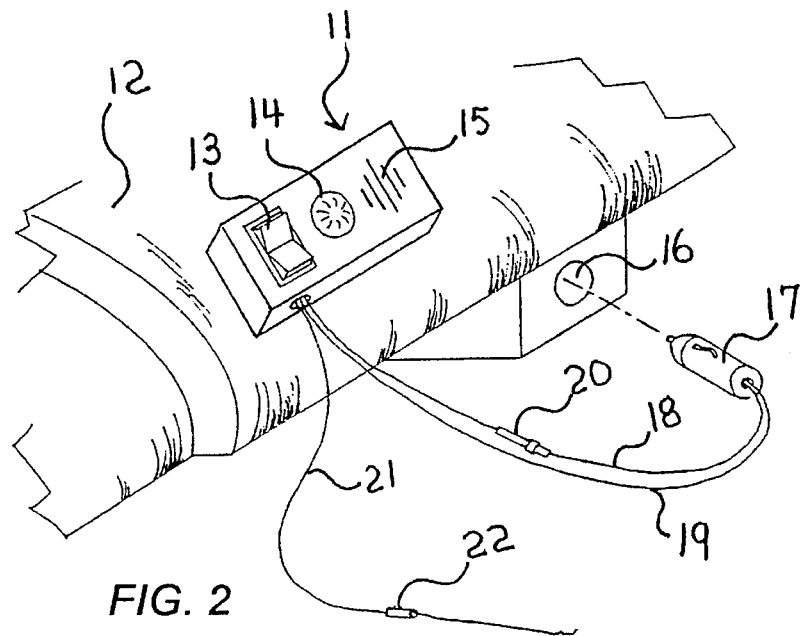
FIG. 2 is a fragmented perspective view of a dashboard of a motor vehicle with the warning box containing the lighted on/off switch, red warning light, and warning buzzer, as well as the power source, the cigarette lighter plug, and conductor wire to the sensor switches.
Figure 3:
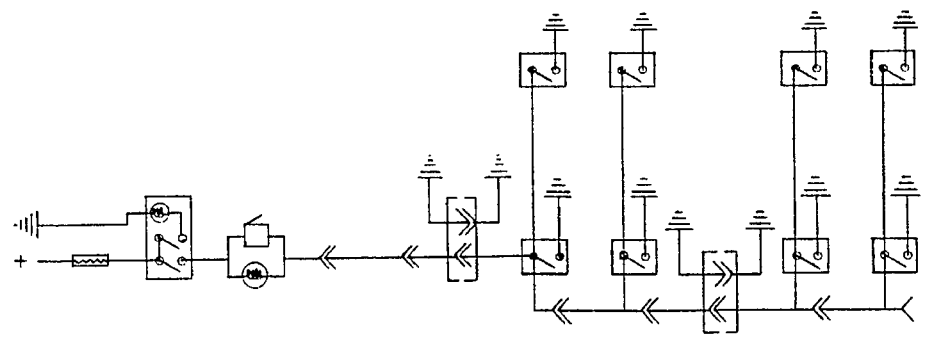
FIG. 3 is a wiring diagram or electrical schematic illustrating a possible set-up of the system with multiple sensor switches wired in parallel on a motor vehicle towing a two axle trailer that is towing another two axle trailer.
Figure 4:
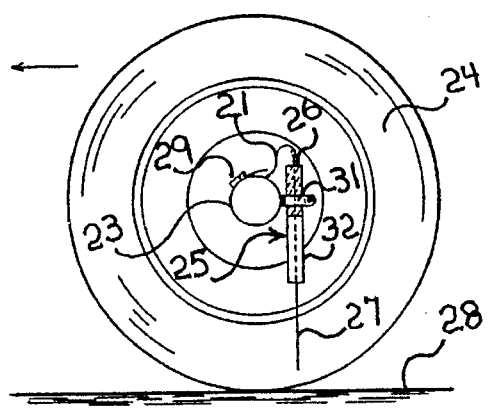
FIG. 4 is a vertical sectional view illustrating the sensor switch mounted on the axle in approximation to a properly inflated tire.

Referring now more specifically to the drawings, and as illustrated in FIG. 2, each low tire warning system includes a warning box 11 containing a lighted on/off switch 13, a red warning light 14, and warning buzzer (audible signal generator) 15. The warning box 11 is small and can be set on, or attach to the dashboard 12 or placed in any other convenient location in the cab where the motor vehicle operator can see and hear the warning signals coming therefrom. The on/off switch 13 is a lighted on/off switch, enabling the operator to know when the device is on and ready to operate. A positive power line 18 with an in-line fuse 20, as well as the ground line 19 for the lighted on/off switch 13 come from the box 11 and are attached to a cigarette lighter plug 17 that, when plugged in a cigarette lighter socket 16 located on the dashboard 12 of most motor vehicles, powers the system. The ability to plug this system into a cigarette lighter socket 16 makes it far more portable than other such devices. As illustrated in FIG. 1 the conductor wire 21 also comes from the box 11 and goes to all sensor switches 25 which are grounded to the chassis of the motor vehicle 36, trailer 37, or other vehicles upon which they are mounted. The plurality of single wire connectors 22 and two wire connectors 34 (plug and receptacle) on the conductor wire 21 facilitate installation of any number of sensor switches 25 serially connected on virtually any vehicle or set of vehicles. The two wire connectors 34 on the conductor wire 21 not only insure a continuity of ground via chassis ground wires 35 but facilitate the quick disconnect of one vehicle from the other. FIG. 1 and the wiring diagram or electrical schematic in FIG. 3 illustrates two possible set-ups of this system with multiple sensor switches 25 wired in parallel on a motor vehicle 36 and trailers 37 being towed.

Figure 6:
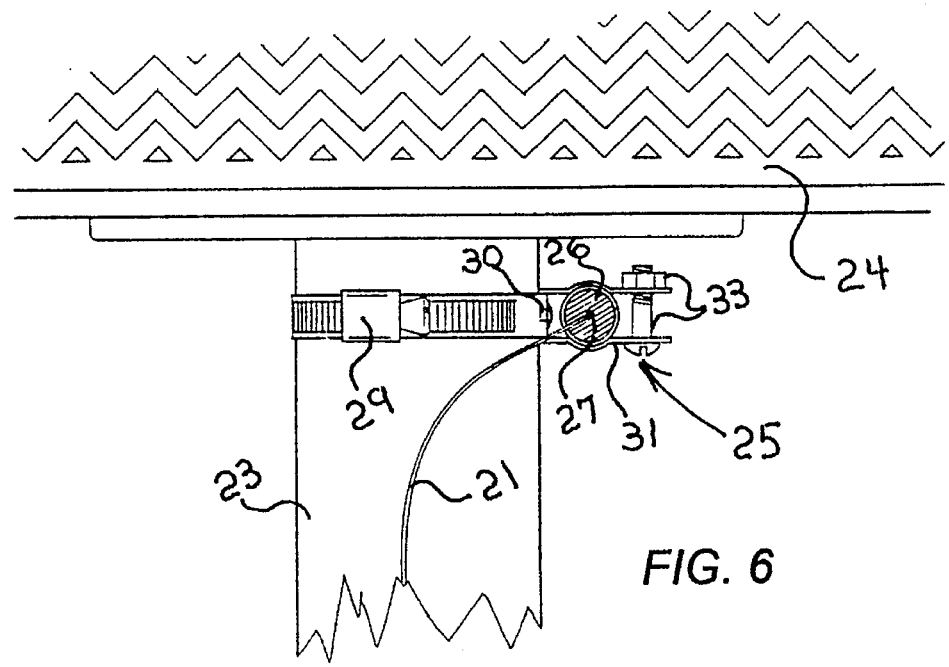
FIG. 6 is an overhead fragmented view of the sensor switch mounted on the axle in approximation to the tire.
Figure 7:
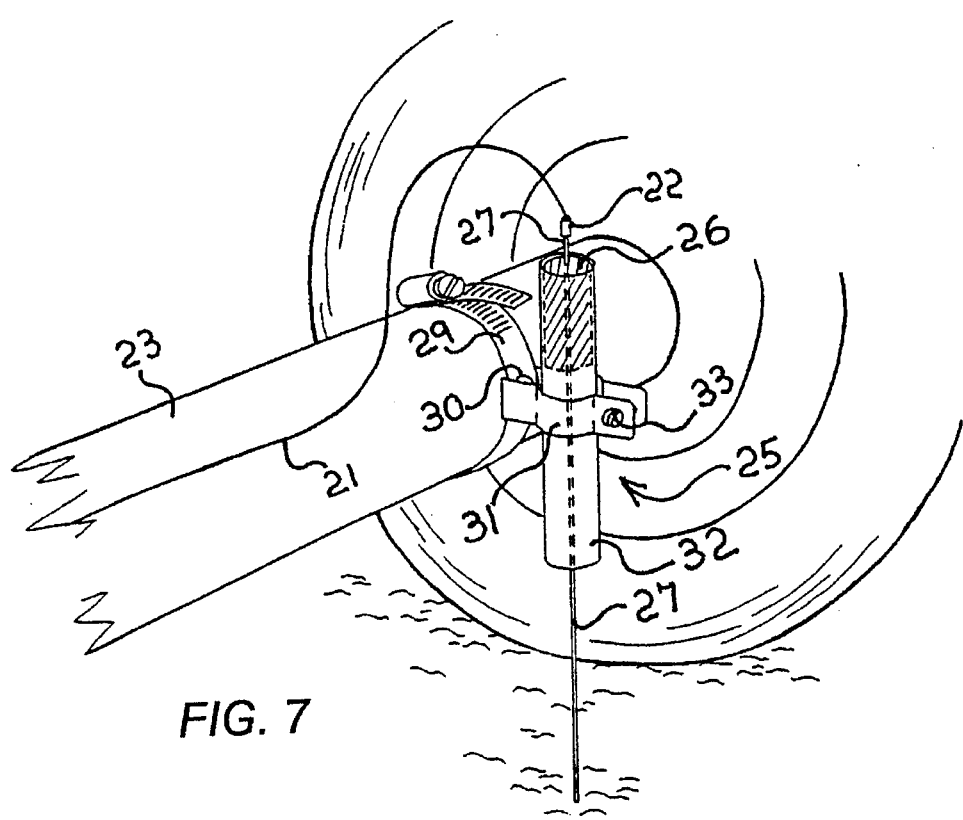
FIG. 7 is a fragmented perspective view of the sensor switch mounted on the axle in approximation to the tire and roadway.

As illustrated in FIG. 7, my low tire warning system also includes a sensor switch 25 that is easily clamped to an axle 23 near the tire 24 by means of a hose type clamp 29, which is also metallic, grounding the sensor switch 25 to the vehicle chassis. The flexibility of the hose type clamp 29 allows the sensor switch 25 to be readily attachable to any shape, size, or type of axle, axle housing, or other suitable part of the vehicle. As illustrated in FIGS. 4, 5, 6, and 7, each sensor switch 25 is mounted on the axle 23 perpendicular to the roadway 28 as near to the tire 24 as is convenient. Unlike some other inventions, no part of the sensor switch 25 need, nor should, come in contact with the side wall of the tire 24 thus avoiding damage to the sensor switch 25 due to floppy tire 24 rubber or fragments therefrom hitting it at high speeds.

As illustrated in FIGS. 6 and 7, the sensor switch 25 consists of a rubber insulator 26 pressed inside the top portion of a metallic cylinder 32 with an electrical spring actuator rod 27 going through the center thereof. The electrical spring actuator rod 27, being insulated from the metallic cylinder 32 by the rubber insulator 26, has the conductor wire 21 attached to the top thereof by means of a connector 22. The electrical spring actuator rod 27 hangs free in the bottom portion of the metallic cylinder 32. The metallic cylinder 32 is short enough to allow the electrical spring actuator rod 27 to protrude downward past the bottom of the metallic cylinder 32 until it nearly touches the roadway 28. The metallic cylinder is held in the proper position by a cylinder holder clamp 31 which is also metallic and has an adjustment bolt and nut 33 allowing the metallic cylinder 32 with the electrical spring actuator rod 27 to be readily adjustable to the proper height for any vehicle or tire size. The closer the electrical spring actuator rod 27 is adjusted to the roadway 28, the more sensitive the system becomes. The cylinder holder clamp 31 is attached to the hose type clamp 29 by a rivet 30 keeping the sensor switch 25 from rotating out of position once the hose type clamp 29 is tightened. The hose type clamp 29 conforms to any shape, size or type of axle or axle housing, or other suitable part of a vehicle.

OPERATION OF THE INVENTION

Figure 5:
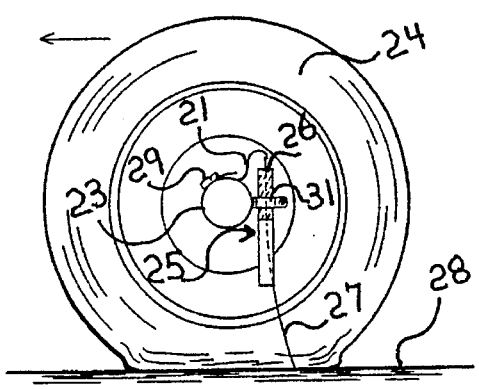
FIG. 5 is a vertical sectional view illustrating that due to a low tire condition, the sensor switch, with the electrical spring actuator rod dragging the roadway, is completing the circuit by coming in contact with the side of the metallic cylinder.

As illustrated in FIG. 5, in the event of a low tire 24, the electrical spring actuator rod 27 strikes the roadway 28, bending it to a point of contact with the bottom edge of the metallic cylinder 32 wall thereby completing the electrical circuit and setting off the warning light 14 and warning buzzer 15. This will alert the operator who may safely stop the vehicle to inspect the tires 24 and take whatever course of action deemed necessary to correct the situation. The electrical spring actuator rod 27 is tempered so that it will return to its free hanging position when the tire is reinflated or changed. The electrical spring actuator rod 27 is also positioned so that it will operate properly in any direction (360 degrees) allowing the vehicles to be backed up without damage to the sensor switch 25. Furthermore, the metallic cylinder 32 of the sensor switch 25 is mounted high enough from the roadway 28 and far enough from the side wall of the tire 24 that it will not be damaged during a low or flat tire event.

SUMMARY, RAMIFICATIONS, AND SCOPE OF INVENTION

The reader hereof will see that this invention is an effective and economical low tire warning system that can be easily installed on virtually any vehicle after their manufacture by practically anyone with moderate mechanical skills. It is also evident that the simplicity of this device, ease of installation, lack of moving parts, few components, and versatility of mounting makes this it far more commercially acceptable, long lasting, and inexpensive as well as extremely reliable.

Notwithstanding the many specificities contained in the above description, they should not be construed as limitations on the scope of the invention, but rather as an exemplification of one preferred embodiment thereof. There are many other variations that are possible. For example, there are many possible variations in lengths of the conductor wire 21 with extensions and plurality of connectors 22 that will enable this system to fit any vehicle or set of vehicles. Other variables that fall within the scope of my invention are size, color, and shape of the box 11 and even a design with the ability to be installed permanently in the face of the dashboard 12. Also, the fact that the cigarette lighter plug 17 can be removed so as to connect the positive power line 18 and ground line 19 to permanent power source and ground, should not be construed without the scope of this invention. Also, the electrical spring actuator rod 27 could have coils therein, for more flexibility.

Thus, the scope of the invention should be determined not only by the embodiment(s) illustrated, but by the appended claims and their legal equivalents.

I claim:

1. A low tire warning system for a vehicle having one or more axles with pneumatic tires being journalized thereon, said warning system comprising:

a warning box including two visual indicators and an audible indicator; wherein only the first one of said visual indicators on when the warning system is on and operable, and the second one of said visual indicators as well as the audible indicator are on for alerting an operator of said vehicle when there is a low tire event;

one or more sensor switches, each sensor switch with a means of mounting and adjusting said sensor switch on one of said axles near said tires of said vehicle;

a conductor wire connecting said warning box with each said sensor switch that are being wired in parallel;

wherein each said sensor switch comprising:

a rubber insulator pressed inside the upper portion of a metallic cylinder with an electrical spring actuator rod going through the center thereof;

wherein said electrical spring actuator rod being insulated from said metallic cylinder by said rubber insulator and having said conductor wire attached to the top thereof; and said electrical spring actuator rod hanging free in the bottom portion of said metallic cylinder, protruding downward past the bottom of said metallic cylinder until it nearly touches a roadway;

wherein, said electrical spring actuator rod which nearly touches said roadway comprises means for bending said rod to a point of contact with a bottom wall of said metallic cylinder thereby completing the electrical circuit which activates said second visual indicator and said audible indicator;

wherein said metallic cylinder is held in the proper position relative to one of said tires and said roadway by a metallic cylinder holder clamp having an adjustment bolt and nut facilitating a means of allowing said metallic cylinder, with said rubber insulator and said electrical spring actuator rod housed therein, to be readily adjustable to the proper height for said vehicle and size of one of said tires; wherein said cylinder holder clamp is attached to a metallic hose type clamp by a rivet to hold the sensor in the proper position relative to one of said tires and said roadway, said hose clamp being flexible enough to allow said sensor switch to be easily attached to different shapes, sizes of types of axles or axle housings, or other parts of said vehicle.

2. The low tire warning system defined by claim 1, further comprising a cigarette lighter plug as a power source to said warning system, wherein said cigarette lighter plug comprises an in-line fuse in a positive power line and a ground line.

3. The low tire warning system defined by claim 1, further comprising a plurality of extensions wires and connectors facilitating a means of ease of installation of said warning system on multiple vehicles, and means for grounding said vehicles to insure a common ground between said vehicles.

4. The low tire warning system defined by claim 1, wherein said sensor switches are in common ground with the chassis of said vehicle and said sensor switches are mounted perpendicular to said roadway.

\* \* \* \* \*